(12) United States Patent
Reshef et al.

(10) Patent No.: US 12,256,467 B2
(45) Date of Patent: Mar. 18, 2025

(54) SYSTEMS AND METHODS FOR MODULE CONFIGURABILITY

(71) Applicant: Intel Corporation, Santa Clara, CA (US)

(72) Inventors: Ehud Reshef, Qiryat Tivon (IL); Eytan Mann, Modiin M (IL); Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 869 days.

(21) Appl. No.: 17/133,453

(22) Filed: Dec. 23, 2020

(65) Prior Publication Data

US 2022/0201468 A1    Jun. 23, 2022

(51) Int. Cl.
*H04W 8/24* (2009.01)
*H04L 41/0806* (2022.01)
*H04W 8/00* (2009.01)

(52) U.S. Cl.
CPC ........... *H04W 8/24* (2013.01); *H04L 41/0806* (2013.01); *H04W 8/005* (2013.01)

(58) Field of Classification Search
None
See application file for complete search history.

(56) References Cited

U.S. PATENT DOCUMENTS

| | | | |
|---|---|---|---|
| 10,567,225 B2* | 2/2020 | Naiden | H04L 67/52 |
| 2010/0274715 A1* | 10/2010 | Beach | G06Q 30/0283 |
| | | | 707/E17.118 |
| 2017/0249135 A1* | 8/2017 | Gandhi | H04L 63/0492 |
| 2018/0224819 A1* | 8/2018 | Noboa | G05B 19/0423 |
| 2019/0356529 A1* | 11/2019 | Gulati | H04L 9/3242 |
| 2021/0034381 A1* | 2/2021 | Fong | G06F 1/1626 |

* cited by examiner

*Primary Examiner* — Atta Khan
(74) *Attorney, Agent, or Firm* — Banner & Witcoff Ltd.

(57) ABSTRACT

A component (e.g. a module configuration system) of a device may include an interface and processor circuitry. The processor circuitry may be configured to: determine identification information of a hardware device (e.g. module, microchip) connected to the component via the interface; obtain device information for the connected hardware device based on the determined identification information; and initialize the connected hardware device based on the obtained device information.

20 Claims, 11 Drawing Sheets

SYSTEMS AND METHODS FOR MODULE CONFIGURABILITY

TECHNICAL FIELD

Various aspects of this disclosure generally relate to module configuration systems and methods. Some aspects relate to cloud-based configurations.

BACKGROUND

Wireless transmitters are configured to comply with one or more regulatory constraints (e.g. max Transmission power, Error Vector Magnitude (EVM), etc.) and/or module-specific configurations (e.g. stock-keeping unit (SKU)). The specific settings for individual transmitters may be different due to silicon and bill-of-material (BOM) performance variations. The configurations are generally encoded into a secure memory, such as a One Time Programmable (OTP) memory, on the module during production. This generally requires embedding fairly large OTP memories into module, such as on the radio-frequency (RF) and media access control (MAC) portions of the implementation.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
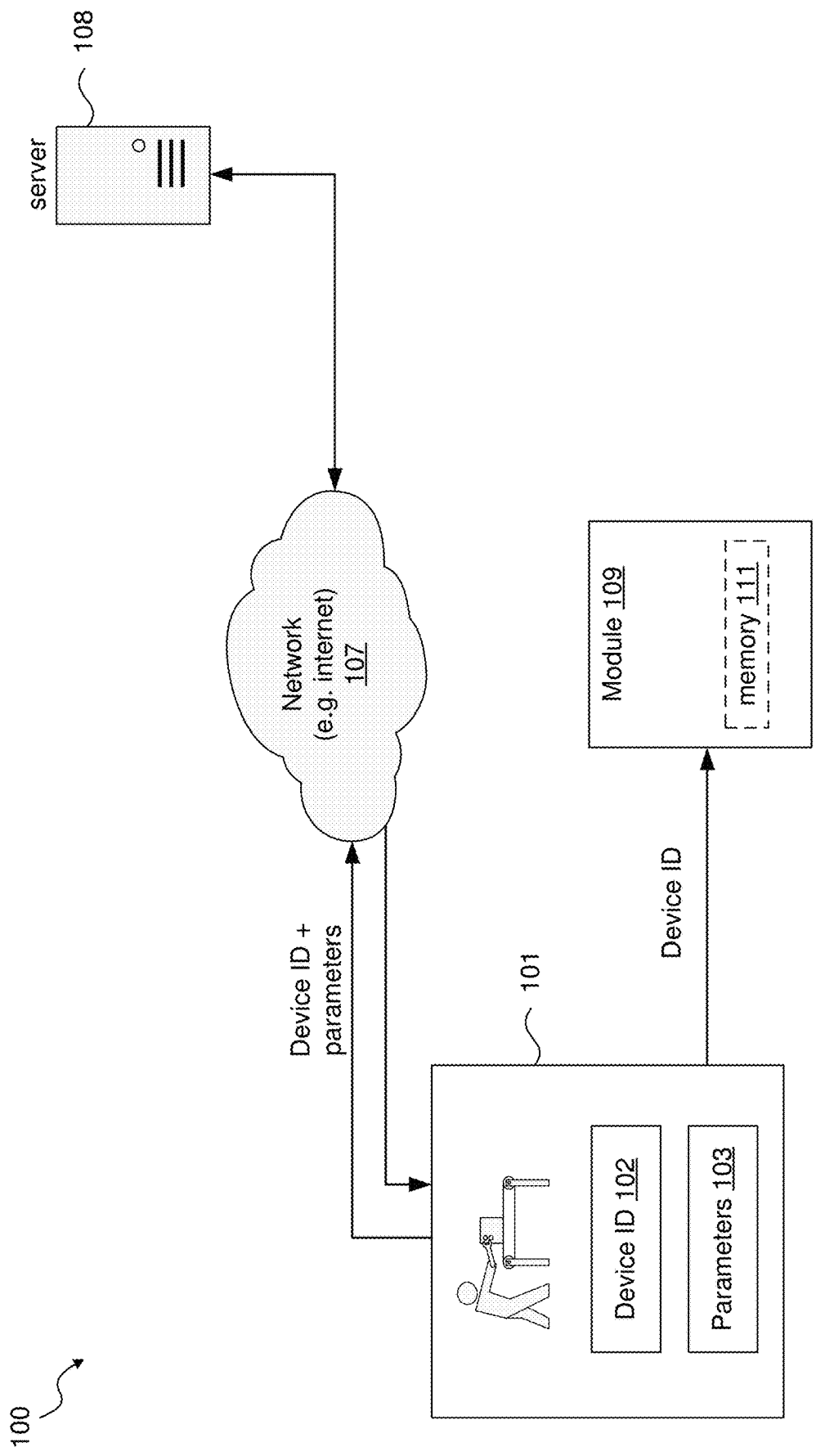
FIG. 1 illustrates a module configuration system according to exemplary aspects of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In system for storing and managing module and platform level regulatory constraints and capabilities, parameters and other information (e.g. per-device parameters and configurations, such as regulatory information, SKU information, or the like) may be stored in module or platform level non-volatile memory (NVM), such as One Time Programmable (OTP) memory. Alternatively, in systems without module-level or platform-level NVM, module and/or device parameters may be set in hardware or Firmware, and as such set to the "Least common denominator" performance level. In such systems, the module specific parameters and/or information is "burned" in module specific OTP/NVM during the module production. This increases module cost, reduces or eliminates the possibility of in-field upgrades or repair, and/or potentially creates a potential need for device recalls (e.g. in case of critical errors during production).

Aspects of the present disclosure are directed to systems and methods for configuring wireless transmitter modules (microchips). Although the disclosure is described with reference to wireless transmitters and communication systems, aspects are applicable to the configuration of any module, electronic component, and/or computer system or component that may store one or more parameters (e.g. module specific parameters), including regulatory information, stock-keeping unit (SKU) information, and/or other information as would be understood by one of ordinary skill in the art, in an external storage (e.g. secure cloud-based storage or other external database). Further, while the disclosure is described in the context of a wireless module and includes examples of regulatory parameters and capability settings, aspects of the disclosure may be generally applied to remote in-field configuration updates for other platforms and/or modules within a connected platform, as would be one of ordinary skill in the arts.

In exemplary aspects, the stored parameters and/or information may be securely download into a platform associated with the module/component. These aspects advantageously reduce the quantity of (or need for) one or more module specific configurations by leveraging a unique module identification (ID). In addition to removing (or vastly reducing the size of) OTP memory, this invention allows in-field upgrades of module configuration parameters.

In one or more exemplary aspects, a unique identification (ID) is embedded in each module, a complete set of configuration information required by the module (e.g. regulatory parameters, enabled/disabled capabilities, or the like) is stored in an external database (e.g. secure storage, such as a secure cloud server), the cloud server is periodically checked (e.g. at the boot cycle, on a specified or random time schedule, any other pre-defined period and/or event, or the like) for configuration changes, and the configuration changes are downloaded to the platform in a secure communication. The downloaded configuration information and/or parameters then then stored in a secure storage (e.g. any platform level secure NVM) and applied the confirmation information and/or parameters at the platform level. In an exemplary aspect, a default configuration may be applied through firmware, and be a common configuration for a specific product (part number).

In some aspects, the system may periodically check the external database (e.g. cloud server) for a Declaration of Conformity (DoC) (or other type of certificate guaranteeing the availability of certification) related to the combination of the hardware with a new software component (i.e., the module of a unique ID).

The aspects of the present disclosure advantageously: reduces the per-module OTP/NVM size, allow in-field capabilities and/or performance upgrade (e.g. by updating module specific operational parameters in the cloud), increases the flexibility to handle regulatory and other potential "product recall" events by remotely setting new configuration (e.g. in some cases in conjunction with firmware upgrades), reduces inventory because it is no longer necessary to maintain SKU information on the module as it may be managed in the server, and may provide for direct-to-customer upselling, such as by providing customers the option to upgrade/enable new product capabilities (as they become available) for a fee.

Figure 6:
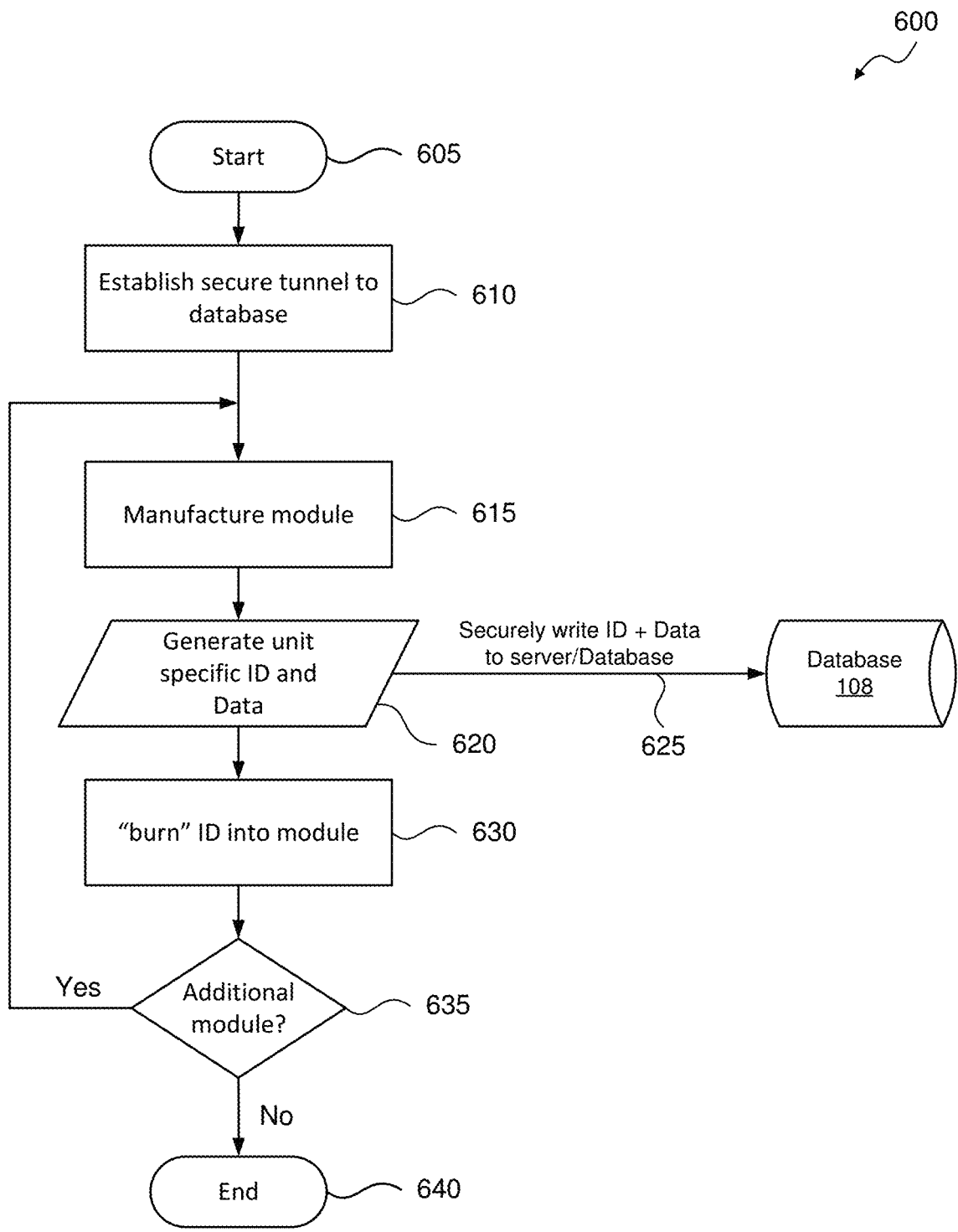
FIG. 6 is a flowchart of a module manufacturing method according to an exemplary aspect of the present disclosure.

FIG. 1 illustrates a system 100 to manufacturing a module 109 according to an exemplary aspect. Operation of the system 100 is described with reference to FIG. 6. In an exemplary aspects of the present disclosure, system 100 includes a configuration device 101 that may connect to an external database/server 108 (operation 610) via a network 107 (e.g. internet). The system 100 may be implemented by, for example, a manufacturer of modules 109 and used during production (operation 615) of the module (e.g. chip) 109 to configure the modules 109 with appropriate identification information 102.

In an exemplary aspect, the configuration device 101 is configured to generate or otherwise determine identification information 102 (e.g. a unique identification (ID) of the hardware device/module 109; a unique product ID; a generic part number and a unit specific identification number) for a hardware device/module 109 (operation 620). The module 109 may include memory 111 configured to store the identification information 102 (operation 630). In other aspects, the module 109 may omit the memory 111 and the identification information 102 may be set in hardware or Firmware of the module 109. The memory 111 may include non-volatile memory (NVM). For example, the NVM may include a One-Time-Programmable (OTP) memory that stores the identification information 102. In some aspects, the memory 111 includes both non-volatile and volatile memories. In an exemplary aspect, the memory 111 (or the hardware/firmware) may also be configured to store device information 103. In some aspects, the memory 111 (and/or hardware/firmware) may store default parameters for the module 109, which may be overwritten or updated based on the device information 103 retrieved from server 108 (see FIG. 2).

In an exemplary aspect, the identification information 102 is generated based on device information 103 (operation 620). The device information 103 may include, for example, one or more parameters; operational parameters, regulatory information and/or parameters; firmware; SKU information; other product (unit) specific data; and/or other information/data as would be understood by one of ordinary skill in the art. In an exemplary aspect, the operational parameters may include register or other settings that will configure the operation (e.g. signal processing functions) in the device 201. In an exemplary aspect, the firmware includes one or more default parameters, which may be overridden by a device driver. The identification information 102 may include numerical characters, alphabetical characters, alphanumeric characters, special characters, and/or other characters as would be understood by one of ordinary skill in the art.

In an exemplary aspect, the configuration device 101 is configured to transmit the identification information 102 and/or the device information 103 to the database 108 (operation 625), which is configured to securely store the identification information 102 and the device information. In an exemplary aspect, the identification information 102 and the device information 103 are securely stored in the database 108 in association with each other. In exemplary aspects, identification information 102 and/or device information 103 is stored in the database 108 instead of storing (e.g. "burning") this information in the module 109, thereby advantageously reducing the size of, or eliminating the need for, an on-module memory in the module 109. The identification information 102 is stored (e.g. burned) in a memory (or implemented in hardware/firmware) of the module 109 (operation 630). The process then can determine if there are additional modules 109 to configure (operation 635). If so, the process can return to operation 615.

Figure 9A:
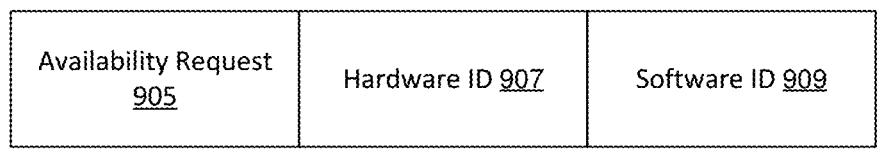
FIGS. 9A-9C illustrate example packet structures according exemplary aspects of the present disclosure.

The communication channel between the configuration device 101 and the database 108 may be secured using one or more conventional encryption techniques as would be understood by one of ordinary skill in the relevant arts. In an exemplary aspect, the database 108 includes processor circuitry and one or memories, where the processor circuitry is configured to perform the operations/functions of the database 108. In an exemplary aspect, the database is a computer, such as computer 900 (FIG. 9).

Figure 2:
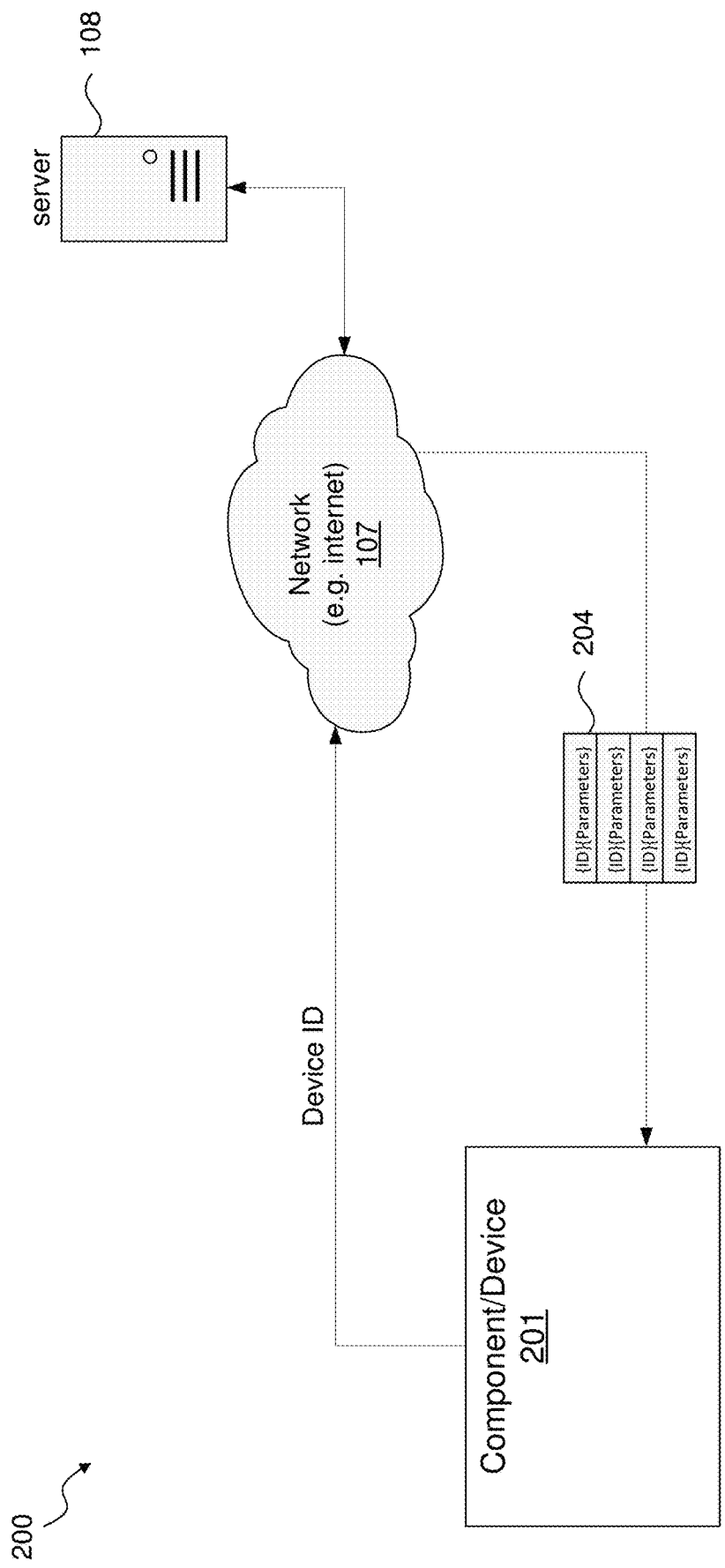
FIG. 2 illustrates a module configuration system according to exemplary aspects of the present disclosure.
Figure 7:
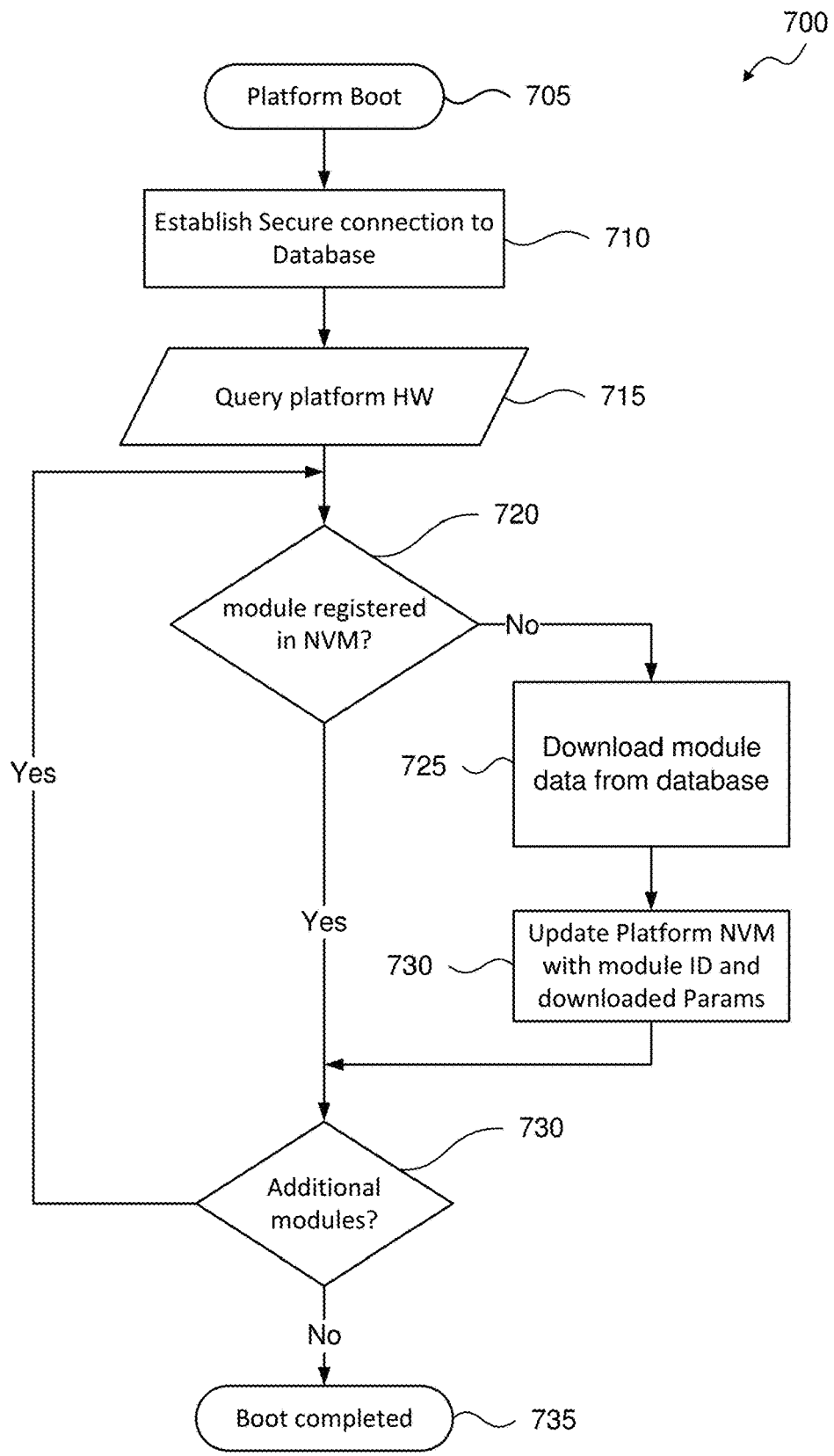
FIG. 7 is a flowchart of a module configuration method according to an exemplary aspect of the present disclosure.

FIG. 2 illustrates a module configuration system 200 according to exemplary aspects of the present disclosure. The operation of the system 200 is described with reference to FIG. 7, which illustrates a module configuration method.

The system 200 includes a configurable device (or component) 201 that may connect to external database/server 108 (operation 710) via network 107 (e.g. internet). The device 201 may include one or more hardware components, or be a hardware component itself. For example, the device 201 may include one or more modules (e.g. chip) 109, or be a module 109 itself.

The system 200 may be implemented by, for example: a manufacturer of devices that implement one or more modules 109 (e.g. used during production of their devices to configure the module(s) 109 implemented therein), users of the device 201, and/or other situations as would be understood by one of ordinary skill in the art. The system 200 may be used, for example, during manufacturing of the device 201, use of the device 201, configuration of the device 201, calibration of the device 201, updating of the device 201, during and/or following adding/removing hardware components within and/or connected to the device 201, and/or other situations as would be understood by one of ordinary skill in the art.

In an exemplary aspect, on device boot, the platform (e.g. device 201) may be configured to scan/query for connected hardware devices and/or hardware devices (e.g. modules 109) implemented therein (operation 715). The scan for connected hardware devices may occur on device boot, on a predetermined schedule, periodically, at a request or instruction from an external device, or the like.

For each of the discovered modules 109, the device 201 may check if the discovered module(s) are registered in the device 201 (operation 720). If the discovered module is not registered, the device 201 may then download the device information 103 (e.g. required firmware; including the default parameters) based on the identification information 102 (operation 725). For example, upon connection to the network 107 (e.g. internet), the device 201 (FIG. 2) may securely access the server 108 and provide the identification information 102 to the server 108. The component/device 102 may then download a set 204 of device information 103 from the server 108 based on the identification information 102 for any or all of the applicable, connected hardware devices/components in the platform. The hardware devices/components may then be securely updated (operation 730) based on the downloaded parameters (e.g. device information 103) to initialize the hardware devices/components. Updated module may then be registered and their associated identification information 102 (e.g. unique IDs). This operation may be repeated for additional discovered modules (operation 730). In an exemplary aspect, the hardware devices/components are initialized when the hardware devices/components is updated based on the downloaded parameters (e.g. device information 103) and/or the hardware devices/components is registered.

In an exemplary aspect, the device 201 may include a memory 360 (FIG. 3) that is configured to store a registry of the hardware components of the device 201 and one or more sets (e.g. a last) of the device information 103 downloaded from the server 108. In this example, following the hardware scan (e.g. on boot and/or at a periodic or predetermined time), the device 201 may be configured to compare the ID (e.g. identification information 102) to the IDs registered the memory 360. The device 201 may then be configured to access the server 108 if there was a hardware change since the last boot (or previous update), and download only the necessary device information 103 corresponding to the identification information 102 associated with the changed hardware component. In other aspects, the device 201 may download the device information 103 for the changed hardware component and one or more other (e.g. all) other hardware components registered by the device 201. In another aspect, the device 201 may additionally download device information 103 for one or more other (e.g. non-registered) hardware components.

In an exemplary aspect, the device information 103 includes product specific parameters that identify features that a particular product may support. For example, the device information 103 may identify the radio-frequency (RF) spectrum that the product may use, such as the RF spectrum used for Wi-Fi (e.g. some countries limits the portion of the spectrum 6-7 GHz, but may open it for future use). Other examples include transmit power, which may be regulatory limited at some geographies while it may be relaxed in others; limiting an aspect that the hardware otherwise supports (e.g. the product hardware may support both 1 MHz and 2 MHz on Bluetooth while it may ship limited to 1 MHz, and/or may also support other features such as angle-of-arrival (AOA) or angle-of-departure (AOD) that were not originally enabled). In exemplary aspects, the device information 103 may then be used to expand features supported by the hardware but not initially available for use. This advantageously may be used as a possible post-marker revenue stream.

Figure 8A:
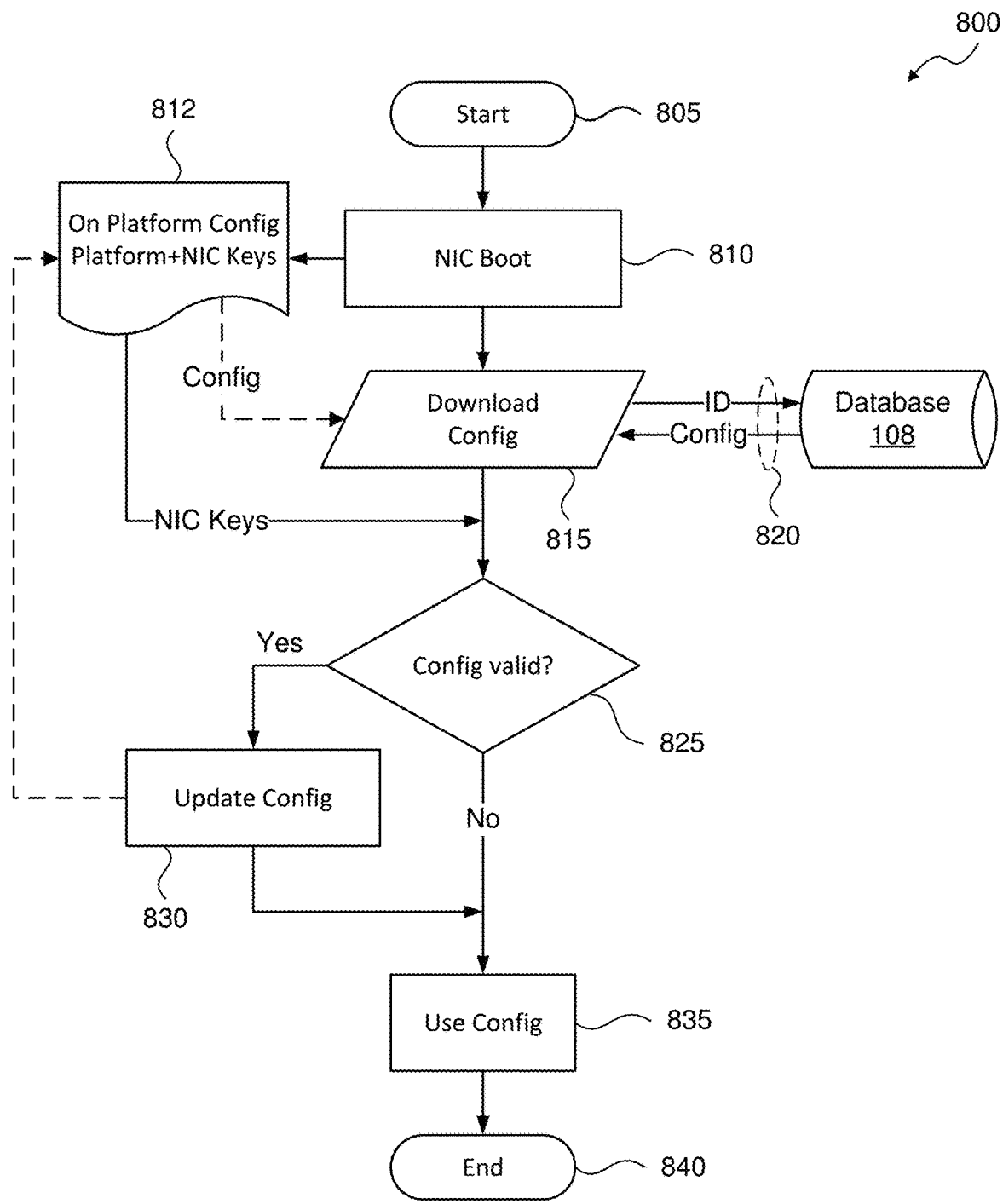
FIG. 8A is a flowchart of a module configuration method according to an exemplary aspect of the present disclosure.

FIG. 8A is a flowchart of a module configuration method according to another exemplary aspect of the present disclosure. The flowchart is similar to the method illustrated in FIG. 7, but includes the downloading of the device information 103 (e.g. configs) without checking if the device information 103 on the database 108 is an updated/newer or different version of the device information 103 currently stored in the device 201 (e.g. in memory 360).

At operation 810, the device initiates a boot sequence, which may include a scan/query for connected hardware devices and/or hardware devices (operation 812). The scan for connected hardware devices may additionally or alternatively occur on a predetermined schedule, periodically, at request or instruction from an external device, or the like. The device 201 may then download the device information 103 (e.g. required firmware; including the default parameters) based on the identification information 102 (operation 815). For example, the device 201 (FIG. 2) may securely access the server 108 and provide the identification information 102 to the server 108 (operation 820). The component/device 102 may then download device information 103 from the server 108 (operation 820) based on the identification information 102.

The device 201 may be configured to check if the downloaded device information 103 is valid device information (operation 825). The checking may be based on keys (e.g. NIC keys) stored in the device 201.

If the device information 103 is valid, the device information 103 of the respective module 109 stored in the platform of the device 201 may be updated based on the downloaded device information 103 (operations 812 and 830).

If the device information 103 is invalid, the device 201 may use the device information 103 of the respective module 109 stored in the platform of the device 201 and discard the corresponding downloaded device information 103 (operation 835).

Figure 8B:
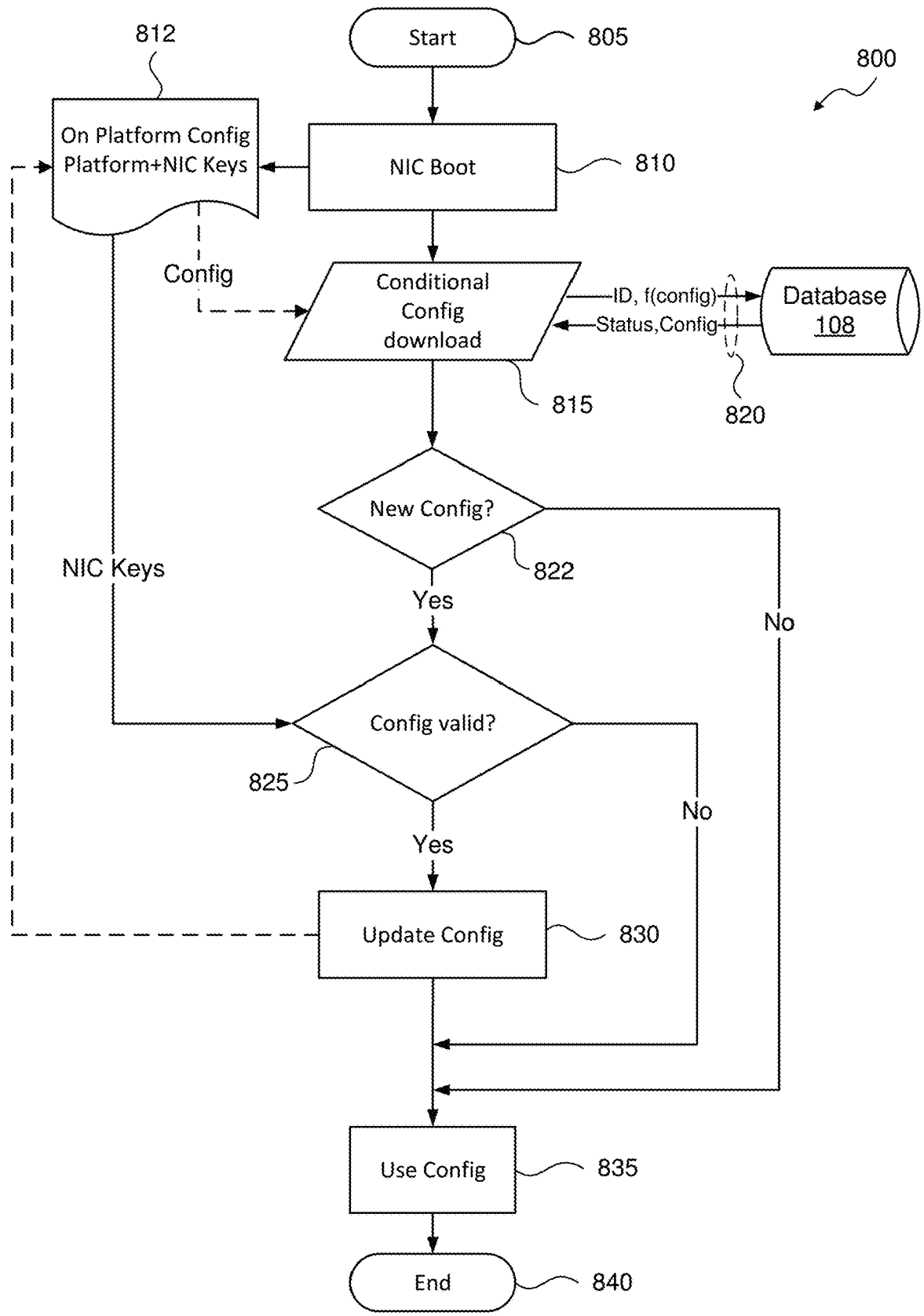
FIG. 8B is a flowchart of a module configuration method according to an exemplary aspect of the present disclosure.

FIG. 8B is a flowchart of a module configuration method according to an exemplary aspect of the present disclosure. The flowchart is similar to the method illustrated in FIG. 8A, but includes a conditional downloading of the device information 103 (e.g. configs).

without checking if the device information 103 on the database 108 is an updated/newer or different version of the device information 103 currently stored in the device 201 (e.g. in memory 360).

At operation 810, the device initiates a boot sequence, which may include a scan/query for connected hardware devices and/or hardware devices (operation 812). The scan for connected hardware devices may additionally or alternatively occur on a predetermined schedule, periodically, at request or instruction from an external device, or the like.

For the conditional downloading process (operation 815), the device 201 may check if the device information 103 of the registered module is outdated (e.g. if the information on the database is an updated/newer or different version. In an exemplary aspect, this checking includes providing identification information 102 and a signature of the corresponding device information 103 to the database 108. The database 108 may then determine the version of the on-platform device information 103 by comparing the signature to a signature of the associated device information 103 stored in the database 108. The status/result of this comparison may be provided to the device 201. If it is determined that the on-platform device information 103 requires updating (e.g. is outdated when compared to the database version), the updated device information 103 may be downloaded (with or separately from) the status information (operation 820).

If a new version of the device information 103 has been downloaded (YES at operation 822), the device 201 may check if the downloaded device information 103 is valid device information (operation 825). The checking may be based on keys (e.g. NIC keys) stored in the device 201.

If the device information 103 is valid, the device information 103 of the respective module 109 stored in the platform of the device 201 may be updated based on the downloaded device information 103 (operation 830).

If the device information 103 is invalid (NO at operation 825) or if a new version of the device information 103 has not been downloaded (NO at operation 822), the device 201 may use the device information 103 of the respective module 109 stored in the platform (block 812) of the device 201 and discard the corresponding downloaded device information 103 (operation 835).

Figure 3:
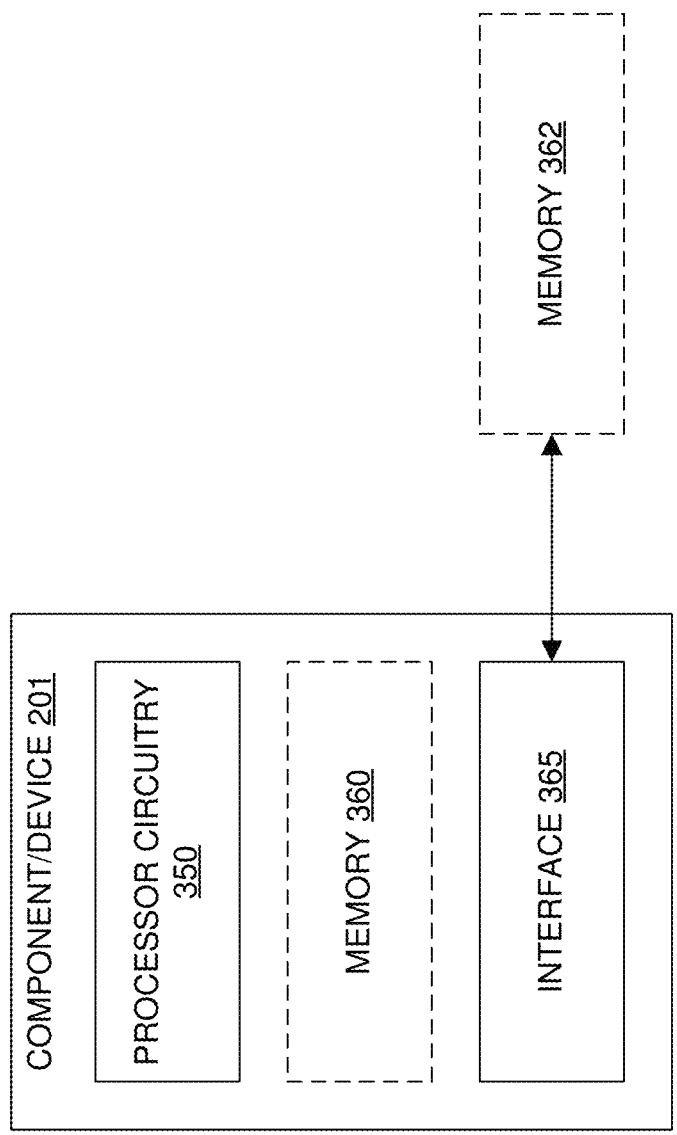
FIG. 3 illustrates a configurable device according to exemplary aspects of the present disclosure.

FIG. 3 illustrates a device/component 201 according to an exemplary aspect of the present disclosure. The device 201 may include processor circuitry 350, a memory or storage element 360, and an interface 365. In an exemplary aspect, the interface 365 is configured to communicate with one or more external memories or storage elements 362 and/or one or more devices (e.g. database 108). In an exemplary aspect, the interface 365 includes processor circuitry that is configured to perform one or more functions/operations of the interface 365, including interfacing and communicating with one or more other devices/memories.

The processor circuitry 350 is configured to control the overall operation of the device 201, such as controlling the operation of the interface 365 or other components of the device 201. For example, the processor circuitry 350 may be configured to control the transmitting and/or receiving of communications via the interface 365. In an exemplary aspect, the processor circuitry 350 further includes a memory that stores data and/or instructions, where when the instructions are executed by the processor circuitry 350, controls the processor circuitry 350 to perform the functions of the device 201.

In one or more aspects, the interface 365 may include one or more wireless transceivers configured to transmit and/or receive wireless communications via one or more wireless technologies (e.g. when the device 201 is a communication device as shown and described with reference to FIG. 5). In other aspects, the device 201 may include one or more dedicated transceivers separate from the interface 365. The interface 365 may be configured to communicate with one more external memories 362.

In some aspects, the memory 360 is optional. In aspects where the device 201 includes memory 360, the memory 360 may store identification information 102 and/or device information 103. In aspects where the device 201 does not include memory 360, the identification information 102 and/or the device information 103 may be set in hardware or Firmware of the device 201 or may be accessed via clouds-based storage (e.g. database 108). The memory 360 may include non-volatile memory (NVM). For example, the NVM may include a One-Time-Programmable (OTP) memory that stores the identification information 102. In some aspects, the memory 360 includes both non-volatile and volatile memories.

Figure 4B:
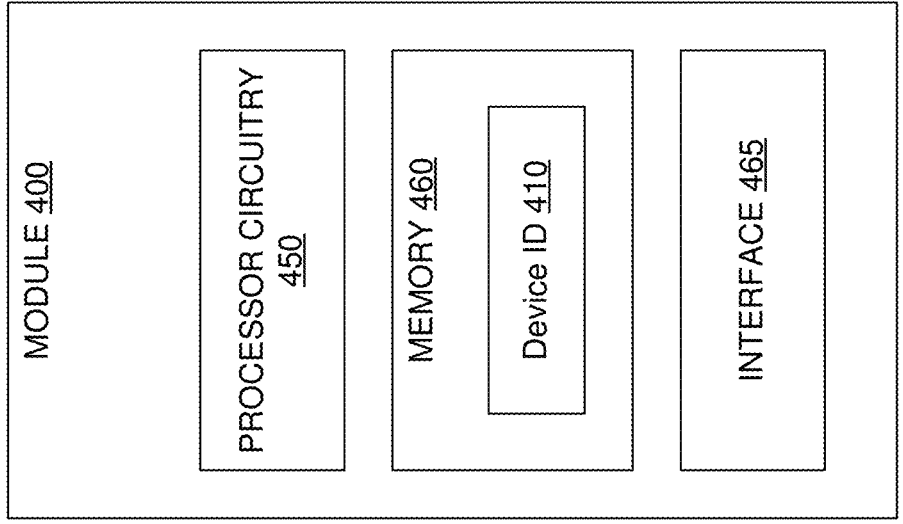
FIGS. 4A-4B illustrate a configurable module or chip according to exemplary aspects of the present disclosure.
Figure 4A:
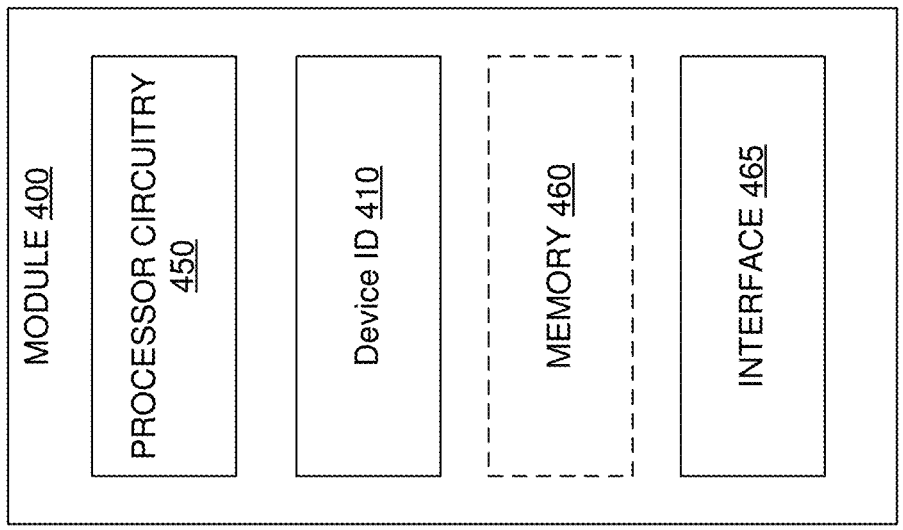

FIGS. 4A and 4B illustrate a module 400 according to exemplary aspects of the present disclosure. The module 400 may be aspects of the module 109 illustrated in FIG. 1.

In an exemplary aspect, the module 400 includes processor circuitry 450 and interface 456. The module 400 may be an integrated circuit (e.g. microchip) in one or more aspects.

In some aspects, the module 400 may include memory 460 as illustrated in FIG. 4B. The memory 460 is configured to store the identification information 410 (e.g. identification information 103). In aspects where the module 400 omits the memory 460, identification information 410 may be set in hardware or Firmware of the module 400.

The memory 460 may include non-volatile memory (NVM). For example, the NVM may include a One-Time-Programmable (OTP) memory that stores the identification information 103. In some aspects, the memory 460 includes both non-volatile and volatile memories. In an exemplary aspect, the memory 460 (or the hardware/firmware) may also be configured to store device information 410. In some aspects, the memory 460 (and/or hardware/firmware) may store default parameters for the module 400, which may be overwritten or updated based on the device information 410 retrieved from server 108 (see FIG. 2).

Figure 5:
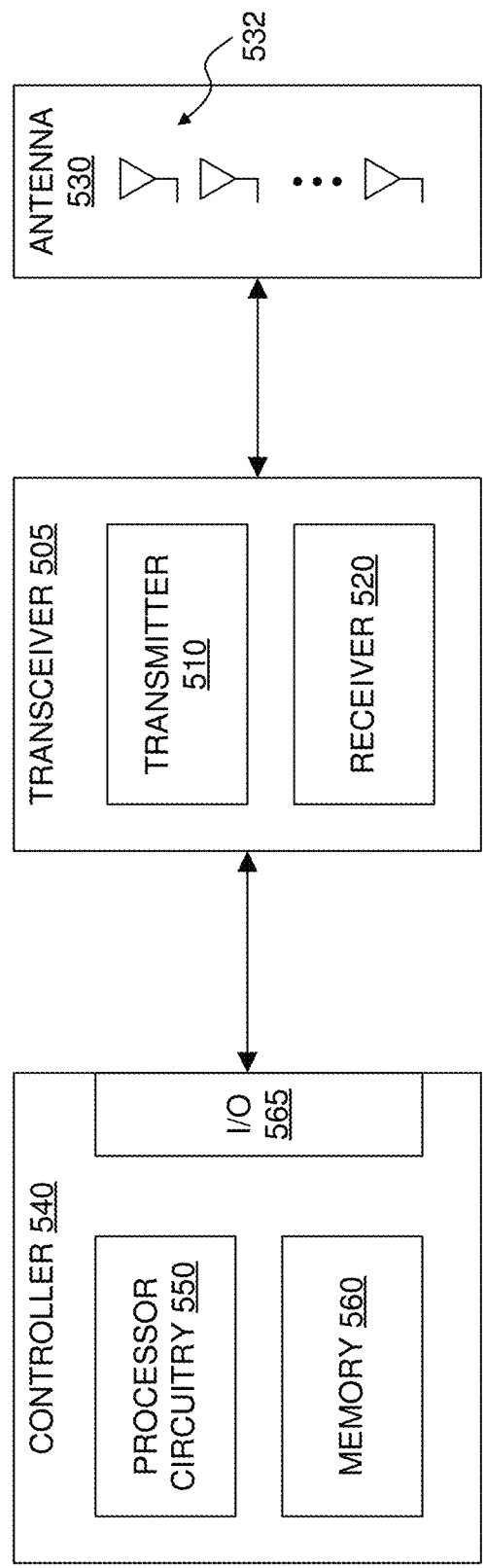
FIG. 5 illustrates the communication device according to exemplary aspects of the present disclosure.

In an exemplary aspect, the device 201 is a wireless communication device, as illustrated in FIG. 5, which illustrates a communication device 501 according to an exemplary aspect of the present disclosure.

The communication device 501 is configured to transmit and/or receive wireless communications via one or more wireless technologies. The communication device 501 may be configured for wireless communications to fifth generation (5G) wireless technologies and related spectrums, or other wireless technologies and spectrums as would be understood by one of ordinary skill in the relevant arts. The other wireless communication technologies may include, but are not limited to Institute of Electrical and Electronics Engineers (IEEE) 802.11 standards, Long Term Evolution (LTE), and/or one or more other communication protocols as would be understood by one of ordinary skill in the relevant arts, such as Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth, ZigBee, or the like.

The communication device 501 may be configured to communicate with one or more other communication devices, including, for example, one or more base stations, one or more access points, one or more other communication devices, one or more network components, and/or one or more other devices as would be understood by one of ordinary skill in the relevant arts. In an exemplary aspect, the communication device 501 may communicate with database 108 to transmit and receive information to and from the database 108 (e.g. transmit identification information 103 to the database 108 and receive device information 104 from the database 108).

In an exemplary aspect, the communication device 501 includes a controller 540 communicatively coupled to one or more transceivers 505 via interface 565 (e.g. interface 365). In an exemplary aspect, the controller 540 includes processor circuitry 550 that is configured to control the overall operation of the communication device 501, such as the operation of the transceiver(s) 505. The processor circuitry 550 may be configured to control the transmitting and/or receiving of wireless communications via the transceiver(s) 505.

In an exemplary aspect, the processor circuitry 550 is configured to perform one or more baseband processing functions (e.g., media access control (MAC), encoding/decoding, modulation/demodulation, data symbol mapping; error correction, etc.) in cooperation with the transceiver 505 or instead of such operations/functions being performed by the transceiver 505. The processor circuitry 550 is configured to run one or more applications and/or operating systems; power management (e.g., battery control and monitoring); display settings; volume control; and/or user interactions via one or more user interfaces (e.g., keyboard, touchscreen display, microphone, speaker, etc.) in one or more aspects.

In an exemplary aspect, the controller 540 further includes a memory 560 that stores data and/or instructions, where when the instructions are executed by the processor circuitry 550, controls the processor circuitry 550 to perform the functions described herein.

The memory 560 may be any well-known volatile and/or non-volatile memory, including, for example, read-only memory (ROM), random access memory (RAM), flash memory, a magnetic storage media, an optical disc, erasable programmable read only memory (EPROM), register, and programmable read only memory (PROM). The memory 560 may be non-removable or removable, or a combination of both.

Examples of the communication device 501 include (but are not limited to) a mobile computing device (mobile device)—such as a laptop computer, a tablet computer, a mobile telephone or smartphone, a "phablet," a personal digital assistant (PDA), and mobile media player; a wearable computing device—such as a computerized wrist watch or "smart" watch, and computerized eyeglasses; and/or internet-of-things (IoT) device. In some aspects of the present disclosure, the communication device 501 may be a stationary communication device, including, for example, a stationary computing device—such as a personal computer (PC), a desktop computer, television, smart-home device, security device (e.g., electronic/smart lock), automated teller machine, a computerized kiosk, and/or an automotive/aeronautical/maritime in-dash computer terminal. The communication device 501 may also be remotely controllable device, such as a drone or other controllable device.

In one or more aspects, the communication device 501 or one or more components of the communication device 501 is additionally or alternatively configured to perform digital signal processing (e.g., using a digital signal processor (DSP)), modulation and/or demodulation (using a modulator/demodulator), a digital-to-analog conversion (DAC) and/or an analog-to-digital conversion (ADC) (using a respective DA and AD converter), an encoding/decoding (e.g., using encoders/decoders having convolution, tail-biting convolution, turbo, Viterbi, and/or Low Density Parity Check (LDPC) encoder/decoder functionality), frequency conversion (using, for example, mixers, local oscillators, and filters), Fast-Fourier Transform (FFT), preceding, and/or constellation mapping/de-mapping to transmit and/or receive wireless communications conforming to one or more wireless protocols and/or facilitate the beamforming scanning operations and/or beamforming communication operations.

The transceiver(s) 505 is configured to transmit and/or receive wireless communications via one or more wireless technologies. In an exemplary aspect, the transceiver 505 includes processor circuitry that is configured for transmitting and/or receiving wireless communications conforming to one or more wireless protocols.

In an exemplary aspect, the transceiver 505 includes a transmitter 510 and a receiver 520 configured for transmitting and receiving wireless communications, respectively, via one or more antennas 130. In aspects having two or more transceivers 505, the two or more transceivers 505 may have their own antenna 530 or may share a common antenna via, for example, a duplexer and/or diplexer in one or more aspects. In an exemplary aspect, the transceiver 505 (including the transmitter 510 and/or receiver 520) is configured to perform one or more baseband processing functions (e.g., media access control (MAC), encoding/decoding, modulation/demodulation, data symbol mapping; error correction, etc.).

The antenna 530 may include one or more antenna/radiating elements 532 forming an integer array of antenna elements. In an exemplary aspect, the antenna 530 is a phased array antenna that includes multiple radiating elements (antenna elements) each having a corresponding phase shifter. The antenna 530 configured as a phased array antenna may be configured to perform one or more beamforming operations that include generating beams formed by shifting the phase of the signal emitted from each radiating element to provide constructive/destructive interference so as to steer the beams in the desired direction. In some aspects, the antenna elements 532 of the antenna 530 may be activated individually rather than as being part of a phased array.

In an exemplary aspect, the device 201 may be configured to verify hardware and software combinations. This may include a check of whether a certificate (e.g. manufacturer certificate) for the combination of the hardware and a new software component is valid. For example, a regulator may require a certification to be present in situations where a new software component (e.g. device information 103 downloaded from the database 108) alters the radio characteristics of the device 201.

Figure 9B:
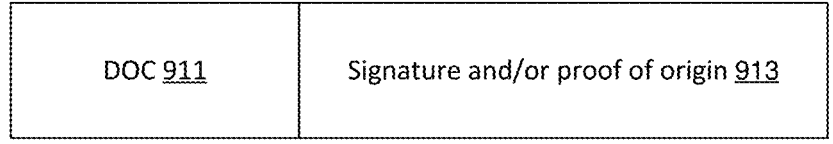
Figure 9C:
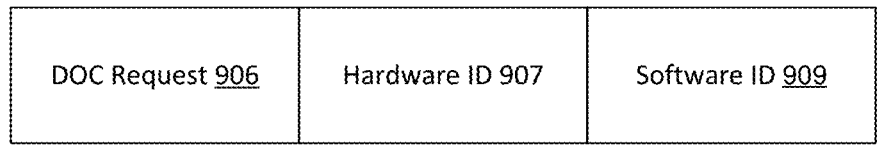

In an exemplary aspect, device 201 may be configured to communicate with a database (e.g. database 108 or another database) to provide a communication (e.g. packet) to the database requesting a Declaration of Conformity (DoC) or other equivalent information (e.g. a token indicating the availability of such a DoC which may be provided upon request). In an exemplary aspect, the token is configured as illustrated by packet 901 in FIG. 9A. The packet 901 may include an availability request 905, a Hardware ID 907, and a Software ID 909. The availability request 905 may be a command that request a confirmation of DOC availability. The Hardware ID 907 and the Software ID 909 corresponding to identifications that identify the particular hardware and software configurations, respectively. In response to receiving packet 901, the database/server may determine the presence of a DOC matching the combination of hardware and software configurations corresponding to the Hardware ID 907 and the Software ID 909. Based on this determination, the database/server may respond to the device with packet 902. An exemplary aspect of packet 902 is illustrated in FIG. 9B, which includes DOC 911 and a signature 913. The DOC 911 may be a Declaration of Conformity, or in some aspects, a pointer to the Declaration of Conformity or equivalent information. The signature 913 may be used by the device 201 to verify the validity and/or proof or origin of the DOC 911. In aspects where the DOC 911 is a pointer to the Declaration of Conformity or equivalent information, the device 201 may respond with a packet 903 that requests the full DOC. An example of packet 903 is illustrated in FIG. 9C. The DOC request 906 is a command requesting the full DOC. In some aspects, the DOC request 906 may include the DOC pointer or equivalent information.

Example Computer System

Figure 10:
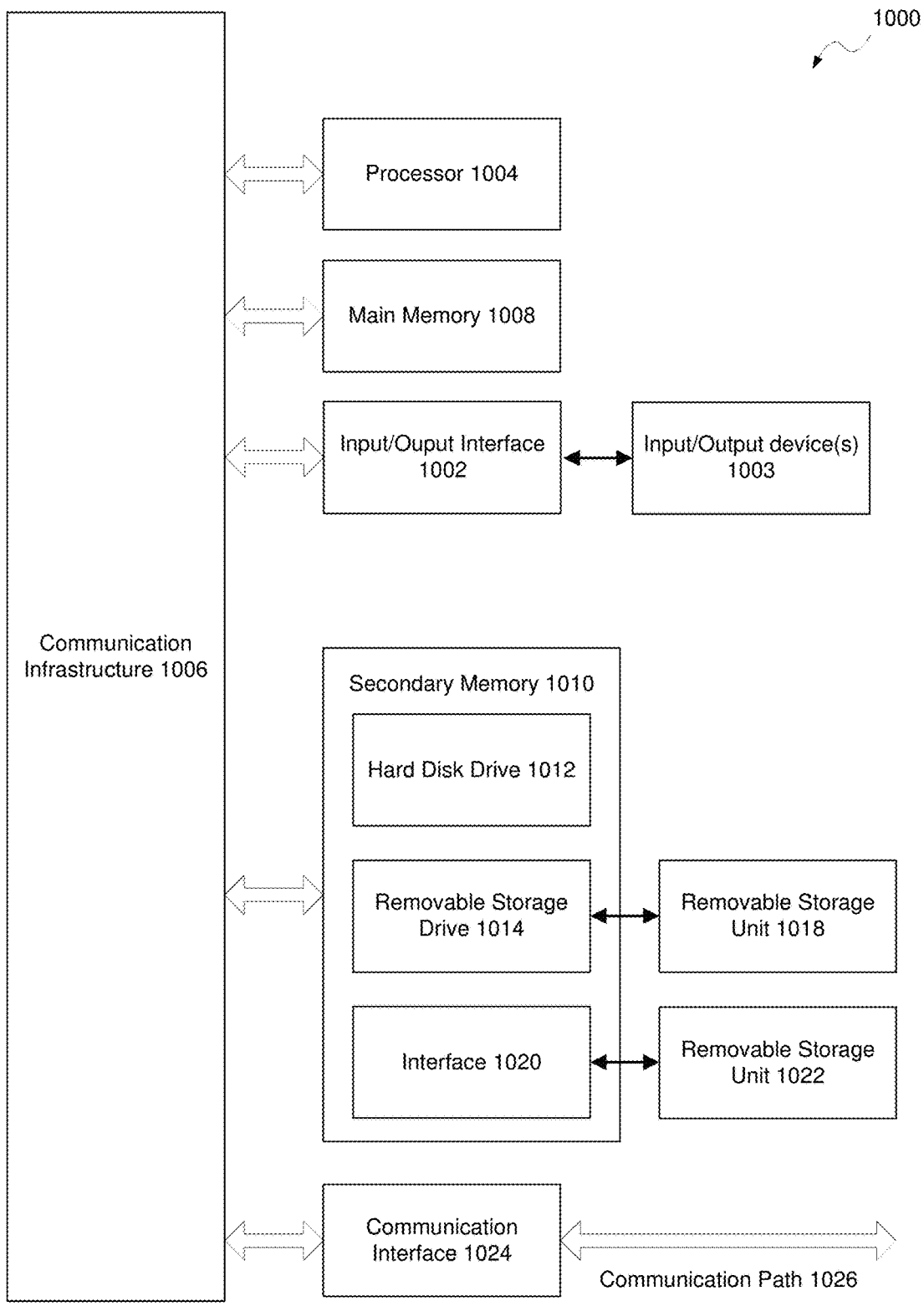
FIG. 10 is an example computer system according to an exemplary aspect of the present disclosure.

Various exemplary aspects described herein may be implemented, for example, using one or more well-known computer systems, such as computer system 1000 shown in FIG. 10. Computer system 1000 may be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an aspect, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1000 also includes user input/output device(s) 1003, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary aspect, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an exemplary aspect, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the aspects using data processing devices, computer systems and/or computer architectures other than that shown in FIG. 10. In particular, aspects may operate with software, hardware, and/or operating system implementations other than those described herein.

EXAMPLES

Example 1 is a component of a device, comprising: an interface; and processor circuitry configured to: determine identification information of a hardware device operably connected to the component via the interface; obtain device information for the connected hardware device based on the determined identification information; and initialize the connected hardware device based on the obtained device information.

Example 2 is the subject matter of Example 1, wherein, to obtain the device information, the processor circuitry is configured to: communicate with a database external to the device to provide the identification information to the database, and receive the device information corresponding to the identification information from the database.

Example 3 is the subject matter of any of Examples 1-2, wherein the processor circuitry is further configured to determine if the device information has been previously obtained by the component, wherein the initialization of the connected hardware device is further based on whether the device information has been previously obtained.

Example 4 is the subject matter of any of Examples 1-3, further comprising a memory, wherein the processor circuitry is further configured to store the obtained device information in the memory.

Example 5 is the subject matter of Example 4, wherein the processor circuitry is further configured to determine if the connected hardware device is registered in the memory of the component, wherein the initialization of the connected hardware device is further based on whether the connected hardware device is registered.

Example 6 is the subject matter of any of Examples 1-5, wherein the processor circuitry is further configured to determine if the obtained device information is valid device information, the initialization of the connected hardware device being further based on validity of the obtained device information.

Example 7 is the subject matter of Example 6, wherein the processor circuitry is further configured to associate the obtained device information with the identification information, the obtained device information and the identification information being stored in the memory in an associated relationship.

Example 8 is the subject matter of any of Examples 1-7, wherein the identification information comprises a unique identification of the hardware device.

Example 9 is the subject matter of any of Examples 8, wherein the identification information comprises product identification information.

Example 10 is the subject matter of any of Examples 1-9, wherein the device information comprises firmware for the hardware device.

Example 11 is the subject matter of any of Examples 1-10, wherein the device information comprises regulatory parameters for the hardware device.

Example 12 is the subject matter of any of Examples 1-11, further comprising a transceiver that is configured to communicate with a database external to the device to obtain the device information for the hardware device.

Example 13 is the subject matter of any of Examples 1-11, wherein the processor circuitry is configured to control a transceiver of the device to communicate with a database external to the device to obtain the device information of the hardware device.

Example 14 is the subject matter of any of Examples 1-13, wherein the device information comprises operational parameters for the hardware device.

Example 15 is the subject matter of any of Examples 1-14, wherein the initialization of the connected hardware device based on the obtained device information comprises updating the connected hardware device based on the device information.

Example 16 is a communication device comprising the component of any of Examples 1-15.

Example 17 is an apparatus, comprising: an interface; and processor circuitry configured to: generate identification information for a hardware device connected to the apparatus via the interface; apply the identification information to the connected hardware device; associate the identification information with device information for the connected hardware device; and provide the associated identification information and device information to an external device via the interface.

Example 18 is a component of a device, comprising: interface means; and processing means for: determining identification information of a hardware device operably connected to the component via the interface means; obtaining device information for the connected hardware device based on the determined identification information; and for initializing the connected hardware device based on the obtained device information.

Example 19 is the subject matter of Example 18, wherein, to obtain the device information, the processing means is configured to: communicate with a database external to the device to provide the identification information to the database, and receive the device information corresponding to the identification information from the database.

Example 20 is the subject matter of any of Examples 18-19, wherein the processing means is further configured to determine if the device information has been previously obtained by the component, wherein the initialization of the connected hardware device is further based on whether the device information has been previously obtained.

Example 21 is the subject matter of any of Examples 18-20, further comprising a memory storage means, wherein the processing means is further configured to store the obtained device information in the memory storage means.

Example 22 is the subject matter of Example 21, wherein the processing means is further configured to determine if the connected hardware device is registered in the memory storage means of the component, wherein the initialization of the connected hardware device is further based on whether the connected hardware device is registered.

Example 23 is the subject matter of any of Examples 18-22, wherein the processing means is further configured to determine if the obtained device information is valid device information, the initialization of the connected hardware device being further based on validity of the obtained device information.

Example 24 is the subject matter of Example 23, wherein the processing means is further configured to associate the obtained device information with the identification information, the obtained device information and the identification information being stored in the memory storage means in an associated relationship.

Example 25 is the subject matter of any of Examples 18-24, wherein the identification information comprises a unique identification of the hardware device.

Example 26 is the subject matter of any of Examples 25, wherein the identification information comprises product identification information.

Example 27 is the subject matter of any of Examples 18-26, wherein the device information comprises firmware for the hardware device.

Example 28 is the subject matter of any of Examples 18-27, wherein the device information comprises regulatory parameters for the hardware device.

Example 29 is the subject matter of any of Examples 18-28, further comprising transceiving means for communicating with a database external to the device to obtain the device information for the hardware device.

Example 30 is the subject matter of any of Examples 18-28, wherein the processing means is configured to control a transceiving means of the device to communicate with a database external to the device to obtain the device information of the hardware device.

Example 31 is the subject matter of any of Examples 18-30, wherein the device information comprises operational parameters for the hardware device.

Example 32 is the subject matter of any of Examples 18-31, wherein the initialization of the connected hardware device based on the obtained device information comprises updating the connected hardware device based on the device information.

Example 33 is a communication device comprising the component of any of Examples 18-32.

Example 34 is an apparatus, comprising: interfacing means; and processing means for: generating identification information for a hardware device connected to the apparatus via the interface; applying the identification information to the connected hardware device; associating the identification information with device information for the connected hardware device; and providing the associated identification information and device information to an external device via the interface.

Example 35 is an apparatus as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry may include memory that stores data and/or instructions. The memory may be any well-known volatile and/or non-volatile memory, including, for example, read-only memory (ROM), random access memory (RAM), flash memory, a magnetic storage media, an optical disc, erasable programmable read only memory (EPROM), register, and programmable read only memory (PROM). The memory may be non-removable, removable, or a combination of both.

Aspects of the present disclosure and any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-GSA (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme may be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein may also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein may also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. (i.e. some or all features defined for network equipment may be implemented by a UE and/or "base station/AP").

The invention claimed is:

1. A component of a device, comprising:
an interface; and
processor circuitry configured to:
   determine identification information of a hardware device operably connected to the component via the interface;
   obtain device information for the connected hardware device based on the determined identification information,
   wherein the connected hardware device stores initial predetermined operational parameters, and
   wherein the device information comprises operational parameters that are separate from a firmware of the connected hardware device and specify configuration settings for operation of the connected hardware device in conjunction with the firmware; and initialize the connected hardware device based on the obtained device information by overwriting the initial predetermined operational parameters stored in the hardware device with the operational parameters of the obtained device information, wherein the initial predetermined operational parameters of the connected hardware device identify a radio-frequency (RF) spectrum and transmit power in accordance with first regulatory requirements, wherein the operational parameters of the obtained device information identify a RF spectrum and transmit power in accordance with second regulatory requirements, and wherein the first regulatory requirements and the second regulatory requirements are different than one another.

2. The component according to claim 1, wherein, to obtain the device information, the processor circuitry is configured to:

communicate with a database external to the device to provide the identification information to the database, and receive the device information corresponding to the identification information from the database.

3. The component according to claim 1, wherein the processor circuitry is further configured to determine if the device information has been previously obtained by the component, and wherein the initialization of the connected hardware device is further based on whether the device information has been previously obtained.

4. The component according to claim 1, further comprising:

a memory, wherein the processor circuitry is further configured to store the obtained device information in the memory.

5. The component according to claim 4, wherein the processor circuitry is further configured to determine if the connected hardware device is registered in the memory, and wherein the initialization of the connected hardware device is further based on whether the connected hardware device is registered.

6. The component according to claim 1, wherein the processor circuitry is further configured to determine if the obtained device information is valid device information, and wherein the initialization of the connected hardware device is further based on a validity of the obtained device information.

7. The component according to claim 6, wherein the processor circuitry is further configured to associate the obtained device information with the identification information, wherein the obtained device information and the identification information are stored in a memory in an associated relationship with one another.

8. The component according to claim 1, wherein the identification information comprises a unique identification of the connected hardware device.

9. The component according to claim 8, wherein the identification information further comprises product identification information.

10. The component according to claim 1, wherein the device information comprises firmware for the connected hardware device.

11. The component according to claim 1, wherein the device information comprises regulatory parameters for the connected hardware device.

12. The component according to claim 1, further comprising:

a transceiver configured to communicate with a database external to the device to obtain the device information for the connected hardware device.

13. The component according to claim 1, wherein the processor circuitry is configured to control a transceiver of the device to communicate with a database external to the device to obtain the device information of the connected hardware device.

14. The component according to claim 1, wherein the initialization of the connected hardware device based on the obtained device information comprises updating the connected hardware device based on the device information.

15. A communication device comprising the component of claim 1.

16. An apparatus, comprising:

an interface; and processor circuitry configured to:

generate identification information for a hardware device connected to the apparatus via the interface;

apply the identification information to the connected hardware device;

associate the identification information with device information for the connected hardware device, wherein the connected hardware device stores initial predetermined operational parameters, wherein the device information comprises operational parameters that are separate from a firmware of the connected hardware device and specify configuration settings for operation of the connected hardware device in conjunction with the firmware; and provide the associated identification information and device information to an external device via the interface, wherein, upon initialization of the hardware device based on the device information obtained via the external device, the initial predetermined operational parameters stored in the hardware device are overwritten with the operational parameters of the obtained device information, wherein the initial predetermined operational parameters of the connected hardware device identify a radio-frequency (RF) spectrum and transmit power in accordance with first regulatory requirements, wherein the operational parameters of the obtained device information identify a RF spectrum and transmit power in accordance with second regulatory requirements, and wherein the first regulatory requirements and the second regulatory requirements are different than one another.

17. The component according to claim 1, wherein overwriting the initial predetermined operational parameters stored in the connected hardware device with the operational parameters of the obtained the device information enables operation of the connected hardware device in accordance with a set of features that are supported by hardware of the connected hardware device but unavailable in accordance with the initial predetermined operational parameters of the hardware device.

18. The component according to claim 1, wherein the initial predetermined operational parameters of the connected hardware device enable operation of the connected hardware device in accordance with the first regulatory requirements for a first geographic region, wherein the operational parameters of the obtained device information enable operation of the connected hardware device in accordance with the second regulatory requirements for a second geographic region, and wherein the first geographic region and the second geographic region are different than one another.

19. The component according to claim 1, wherein the device information is not stored in a non-volatile memory of the hardware device.

20. The component according to claim 1, wherein the initial predetermined operational parameters of the connected hardware device enable operation of the connected hardware device in accordance with the first regulatory requirements, and wherein, after overwriting the initial predetermined operational parameters with the operational parameters of the obtained device information, the operational parameters of the obtained device information of the connected hardware device enable operation of the connected hardware device in accordance with the second regulatory requirements.

* * * * *